United States Patent [19]

Berger et al.

[11] Patent Number: 5,615,544
[45] Date of Patent: Apr. 1, 1997

[54] SYSTEM FOR MONITORING THE SHAPE OF ROUND BALES

[75] Inventors: John G. Berger, Landisville; Mark K. Chow, Paoli; James T. Clevenger, Jr., Lancaster, all of Pa.

[73] Assignee: New Holland North America, Inc., New Holland, Pa.

[21] Appl. No.: 600,575

[22] Filed: Feb. 13, 1996

[51] Int. Cl.$^6$ ........................................... A01F 15/07
[52] U.S. Cl. ..................... 56/341; 100/88; 364/468.17
[58] Field of Search ................ 56/341, 343; 100/88, 100/99; 364/468

[56] References Cited

U.S. PATENT DOCUMENTS

| | | | |
|---|---|---|---|
| 4,224,867 | 9/1980 | Gaeddert et al. | 100/88 |
| 4,517,795 | 5/1985 | Meiers | 56/341 |
| 4,686,820 | 8/1987 | Andra et al. | 56/341 |
| 4,748,801 | 6/1988 | Sheehan et al. | 56/341 |
| 4,850,271 | 7/1989 | White et al. | 100/88 |
| 4,855,924 | 8/1989 | Strosser et al. | 56/341 X |
| 4,870,812 | 10/1989 | Jennings et al. | 56/341 |
| 5,131,214 | 7/1992 | Vermeer | 56/341 |
| 5,408,817 | 4/1995 | Wagstaff | 56/341 |
| 5,444,969 | 8/1995 | Wagstaff et al. | 56/341 |

*Primary Examiner*—Terry Lee Melius
*Attorney, Agent, or Firm*—Frank A. Seemar; Larry W. Miller; John William Stader

[57] ABSTRACT

A round baler having a main frame, a bale forming chamber on the main frame, a pickup for feeding crop material into the chamber, and a tailgate pivotally connected to the main frame for rearwardly discharging completed bales. The chamber is defined by an apron extending around a plurality of guide rolls on the periphery of the chamber, the tailgate, and a floor. The bale forming chamber varies in size from a core starting position to a full bale position. A crop loading monitor, having sensors in the bale forming chamber, provides signals representing compactness of the crop material during bale formation. The signals are utilized in a system that displays information in a bar graph format that enables the operator to enhance his capabilities for making properly shaped bales.

5 Claims, 7 Drawing Sheets

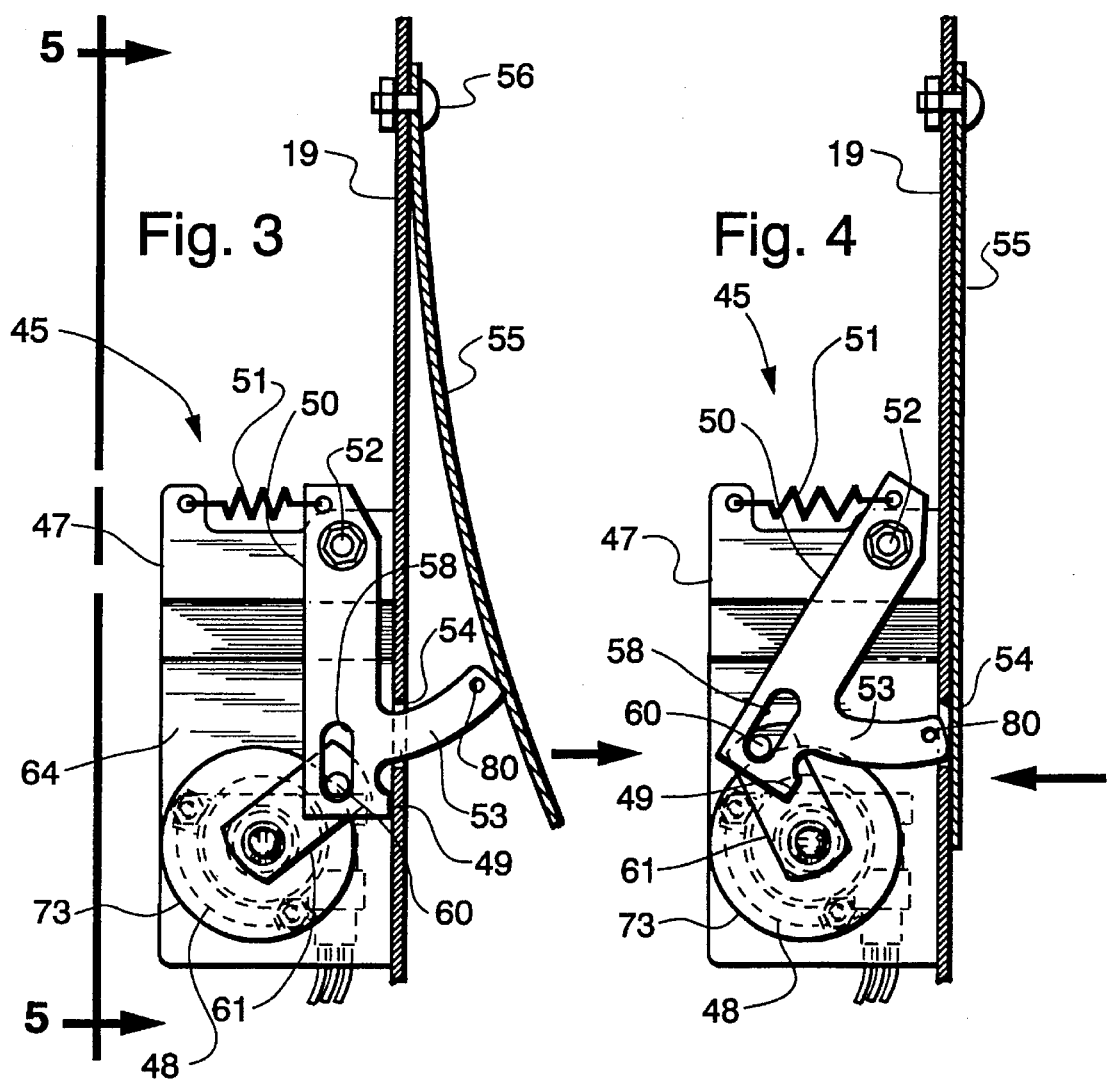
Fig. 3
Fig. 4
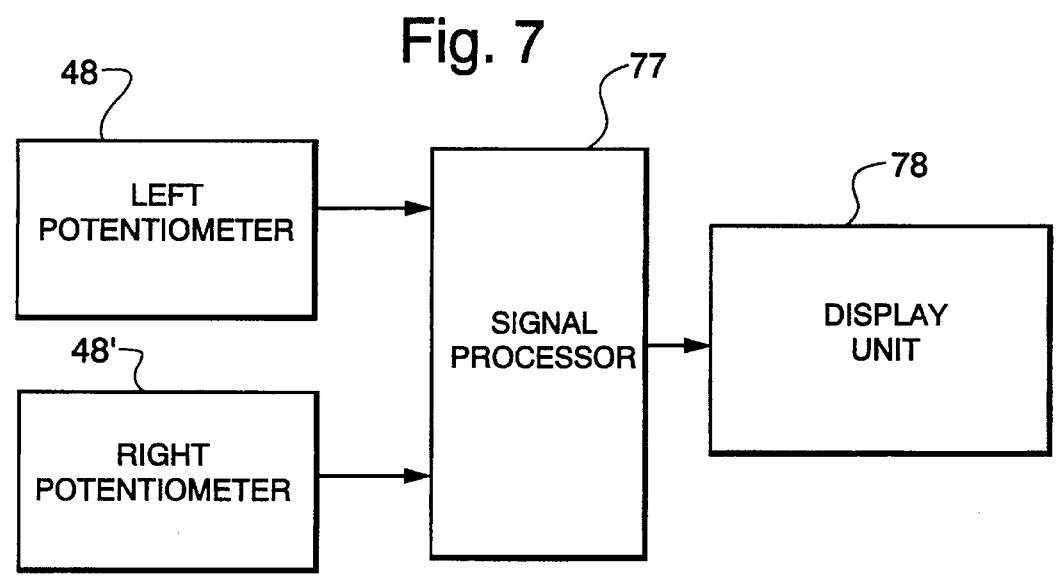
Fig. 7

SYSTEM FOR MONITORING THE SHAPE OF ROUND BALES

FIELD OF THE INVENTION

The present invention relates generally to a shape monitoring system for round balers and more particularly to a system for displaying comparative degrees of compaction of crop material in a round baler chamber as a bale is being formed.

BACKGROUND OF THE INVENTION

It is common for round balers to have a bale forming chamber defined by a pair of opposing side walls associated with an array of side-by-side belts, transverse slats trained on chains, a plurality of rolls or a combination of these various elements, e.g., rolls and belts. During field operation, windrowed crop material such as hay is picked up from the ground and fed into a fixed or variable diameter chamber. The hay is then formed into a cylindrical package, wrapped with twine, net or the like and ejected onto the ground for subsequent handling.

Because it is not uncommon for windrows of crop material to be narrower than the width of the bale forming chamber, it is necessary for the operator to observe the shape of the cylindrical package as it is being formed and to steer the baler along a path that results in uniform transverse distribution of hay to avoid poorly shaped bales. This approach relies on the experience and technique of the operator to determine when to shift the position of the baler relative to the windrow. The lack of exactness, inability to observe the bale shape, reliance on operator skill, and operator fatigue all contribute to the potential for improper feeding resulting in misshaped bales.

During operation of belt type balers, if a substantially uniform diameter is not maintained during feeding, improper tracking occurs which could lead to belt jamming and damage. In addition, unevenly shaped bales cause low density areas on the outer surfaces. This could result in premature deterioration if the bales are exposed to weather extremes, i.e., bales with such low density areas will not shed water as well as those with an evenly shaped and uniformly compacted surface area.

Many present day balers of the various types mentioned above recognize the need for enhancing bale shape. Systems are employed that address the problem of conveniently and consistently forming bales having a substantially uniform diameter throughout their length. This has been accomplished to a certain degree by utilizing monitoring arrangements to ascertain parameters that in turn are used in the control of functions that have a direct bearing on the shape of bales formed. A bale shape control system of this type is disclosed in U.S. Pat. No. 4,748,801, issued Jun. 7, 1988, in the name of Ronald T. Sheehan, et al. This system includes first and second indicator lights, and bale diameter monitoring apparatus for alternately generating signals in response to predetermined incremental expansion of the bale forming chamber. This enables the operator to position the baler to feed crop to one side of the bale forming chamber when a signal is generated in one indicator and to position the baler to feed crop to the other side of the chamber when a signal is generated in the other indicator.

In U.S. Pat. No. 4,224,867, issued Sep. 30, 1980 in the name of Melvin V. Gaeddert, et al, and U.S. Pat. No. 4,517,795, issued May 21, 1985 in the name of Gerald F. Meiers, similar prior art systems are shown in which a monitor senses tension in belts at both sides of the cylindrical package being formed in the chamber and generates signals directly related to the relative diameters. This enables the operator to steer the baler in a manner that will feed crop material to the area in the chamber that is deficient in an attempt to prevent the bale from becoming improperly shaped.

In another system, disclosed in U.S. Pat. No. 4,686,820, issued Aug. 18, 1987 in the name of Bryan K. Andra, et al, tension on the belts is utilized to generate a signal that is used to control apparatus that varies the path of crop being fed to the bale forming chamber. The baler is driven straight down the windrow, hay is picked up, and as it is being conveyed toward the chamber the stream of hay is selectively deflected into one of three regions of the chamber based on diameter differentials.

In yet another prior art system, disclosed in U.S. Pat. No. 5,131,214, issued Jul. 21, 1992, in the name of Gary J. Vermeer, a crop loading monitor is employed to assist the operator in the formation of round bales. The monitor in this instance comprises an interval timer which signals the operator to direct crop material to alternate sides of the baler at preselected time intervals.

The round baler shape monitoring systems described above either monitor the general baler diameter, various relative diameters or the time interval during which crop is being fed. The present invention is an improvement to a round baler having still another type shape monitoring system, one in which the comparative degree of compaction of crop material in different regions of the chamber is monitored. A system of this nature is disclosed in U.S. Pat. No. 5,444,969, issued Aug. 29, 1995 in the name of Robert A. Wagstaff, et al. More particularly, the degree of compaction is sensed by sensors having leaf springs pressing against the sides of the cylindrical package of crop material during formation. In the system disclosed in this patent the display consists of a pair of electrical metering devices which provide the operator with visual information directly proportional to the potential across the terminals of potentiometers that vary in response to varying crop material compaction in the vicinity thereof.

In another prior art system, disclosed in U.S. Pat. No. 4,850,271, issued Jul. 25, 1989 in the name of Bruce L. White, et al, the display comprises a graphic display simulating the shape of the cylindrical package of crop material being formed in the chamber of a round baler.

SUMMARY OF THE INVENTION

An important object of the present invention is to provide an improved system for accurately, reliably and consistently displaying comparative information corresponding to compaction sensed by shape monitoring sensors of the type disclosed in U.S. Pat. No. 5,444,969, resulting in new and useful round baler apparatus with enhanced overall loading performance.

In pursuance of this and other important objects the present invention provides improvements to a round baler having a pickup for picking up crop material and feeding it rearwardly, and an expandable bale forming chamber into which the pickup feeds crop material along a generally spiraling path. The chamber includes opposing sidewalls between which a generally cylindrical shaped package of crop material is formed, and left and right crop compaction sensors each of which is mounted on one of the opposing sidewalls, which sensors include means for sensing the degree of compaction of crop material in the vicinity of the opposing sidewalls under conditions where the crop material is fed along the generally spiralling path during formation of a cylindrical package of crop material in the chamber. The baler further comprises a system for displaying information corresponding to the relative degree of compaction sensed by the left and right crop compaction sensors. The present invention more specifically contemplates display means comprising left and right bar graph indicators for providing independent readouts corresponding to the degree of compaction sensed by the left and right crop compaction sensors, and means for electronically coupling the display means to the sensors.

The foregoing and other objects, features and advantages of the invention will appear more fully hereinafter from a consideration of the detailed description which follows, in conjunction with the accompanying sheets of drawings wherein one principal embodiment of the invention is illustrated by way of example. It is to be expressly understood, however, that the drawings are for illustrative purposes and are not to be construed as defining the limits of the invention.

DESCRIPTION OF THE DRAWINGS

FIG. 3 is a view taken in the direction of arrows 3—3 in FIG. 1 and shows the leaf spring element of the crop compaction sensor in its outermost position.

FIG. 4 is a view similar to FIG. 3 with the leaf spring in its innermost position.

FIG. 7 is a block diagram of the electronic system.

DESCRIPTION OF THE PREFERRED EMBODIMENT

Figure 1:
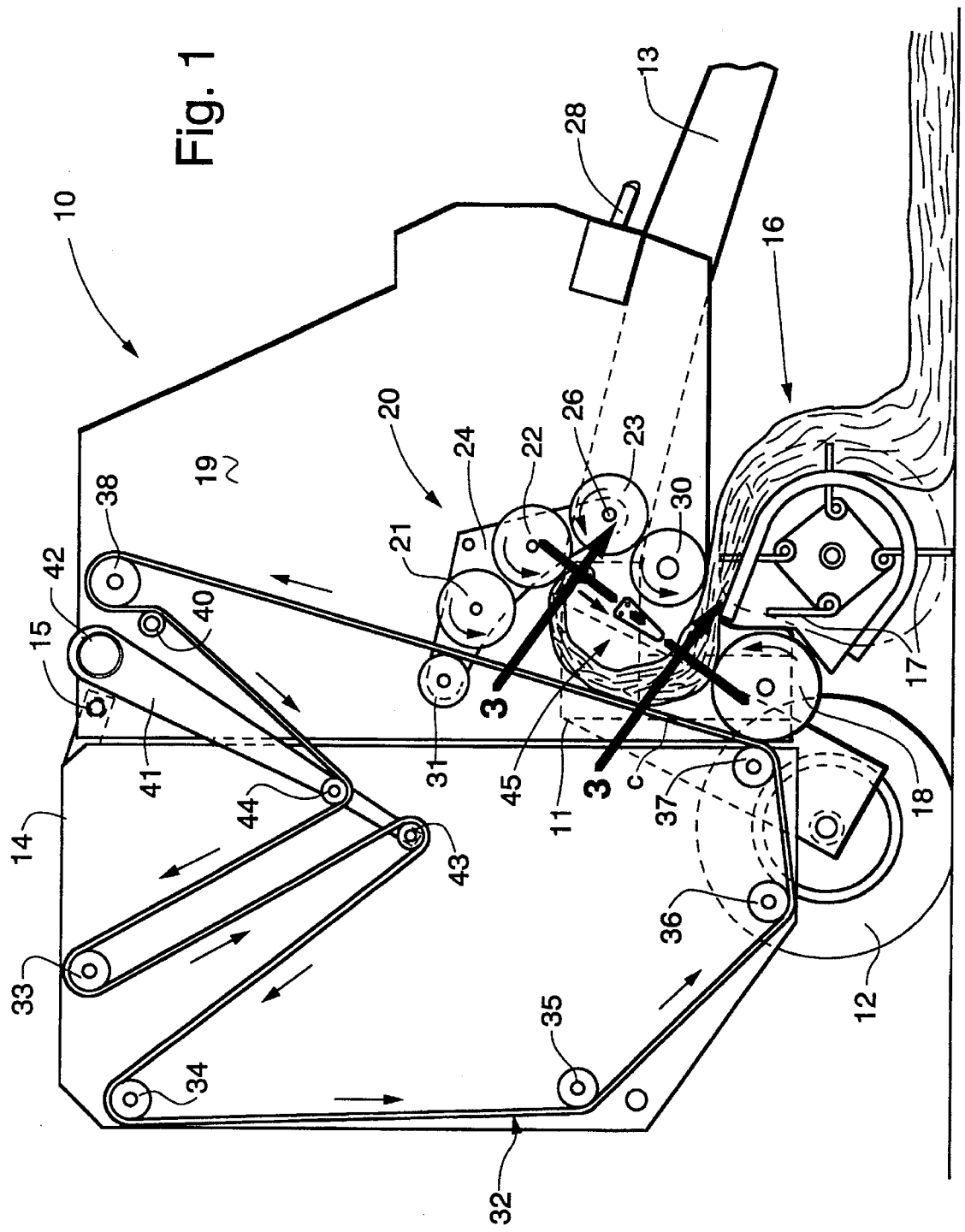
FIG. 1 is a diagrammatic side elevational view of a round baler in which the present invention may be readily incorporated.

Referring now to the drawings for a detailed description of the preferred embodiment of the invention, FIG. 1 shows a round baler 10 of the type having an expandable chamber defined in part by belts and rollers, as disclosed in U.S. Pat. No. 4,870,812, issued Oct. 12, 1989 in the name of Richard E. Jennings, et al. Baler 10 has a main frame 11, including a pair of side walls, supported by a pair of wheels 12 (only one shown). A forwardly mounted tongue 13 is provided on main frame 11 for connection to a tractor. Pivotally connected to a side wall 19 by a pair of stub shafts 15 is a tailgate 14 which is closed during bale formation. Tailgate 14 includes walls coextensive with side walls 19 (one shown) in a conventional manner. A pickup 16, mounted on main frame 11, includes a plurality of tines 17 movable in a predetermined path to lift crop material from the ground and deliver it rearwardly toward a floor roll 18, rotatably mounted on main frame 11.

A chamber for forming bales is defined partly by a sledge assembly 20 comprising a plurality of transversely extending rollers 21, 22, 23 journalled at their ends in a pair of spaced apart arms 24, one of which is shown. These arms are pivotally mounted on stub shafts 26 for providing movement of sledge assembly 20 from the bale starting position shown in FIG. 1 through a continuous range of positions to the full bale position shown in FIG. 2. Rollers 21, 22, 23 are driven in a counter-clockwise direction by conventional means (for example, chains and sprockets) coupled to a drive shaft 28. A starter roll 30, located adjacent roller 23, is also driven counter-clockwise. A freely rotatable idler roller 31, carried by arms 24, moves in an arcuate path with sledge assembly 20.

The bale forming chamber is further defined by an apron 32 comprising a plurality of continuous side-by-side belts supported by guide rolls 33, 34, 35, 36, 37 rotatably mounted in tailgate 14. Apron 32 is also supported on a drive roll 38, mounted on main frame 11. Although apron 32 passes between roller 21 and idler roller 31, it is in engagement only with idler roller 31 and not roller 21 which serves to strip crop material from the belts, in addition to its bale forming function. Suitable coupling means (not shown) connected to drive shaft 28 provide rotation of drive roll 38 causing movement of apron 32 in the directions indicated by the arrows in FIGS. 1 and 2. An additional guide roll 40 in the main frame 11 ensures proper driving engagement between apron 32 and drive roll 38. A pair of take up arms 41 (only one shown) are pivotally mounted on main frame 11 by a cross shaft 42 for movement between inner and outer positions shown in FIGS. 1 and 2. Take up arms 41, which carry additional guide rolls 43, 44 for supporting apron 32, are urged toward their inner positions (FIG. 1), by conventional means, e.g., springs.

When the elements of round baler 10 are disposed as shown in FIG. 1, an inner course c of apron 32 extends between guide roll 37 and idler roll 31 to form the rear wall of the core starting chamber while the inwardly facing peripheral surfaces of rollers 21, 22, 23 define in a general manner a rearwardly inclined cooperating front wall. Floor roll 18 defines the bottom of the chamber and with starter roller 30 defines a transverse inlet for crop material.

When round baler 10 travels across a field, pickup tines 17 lift crop material from the ground and deliver it through the inlet. The crop material is carried rearwardly by floor roll 18 into engagement with apron inner course c (FIG. 1) which urges it upwardly and forwardly into engagement with the rollers on sledge 20. In this manner crop material is coiled in a clockwise direction to start a bale core. Continued feeding of crop material into the bale forming chamber by pickup tines 17 causes apron inner course c to increase around a portion of the increasing circumference of the cylindrical package of crop material being formed in a spiralling fashion. Take up arms 41 rotate from their inner positions shown in FIG. 1 toward their outer positions shown in FIG. 2 to provide for such expansion of the inner course of the apron in a well known manner, i.e., in effect the outer course of the belts of apron 32 is diminished in length while the inner course increases a like amount. After a bale has been formed and wrapped, tailgate 14 is opened and the bale is ejected rearwardly. Subsequent closing of tailgate 14 returns the inner and outer courses of apron 32 to the locations shown in FIG. 1.

Figure 2:
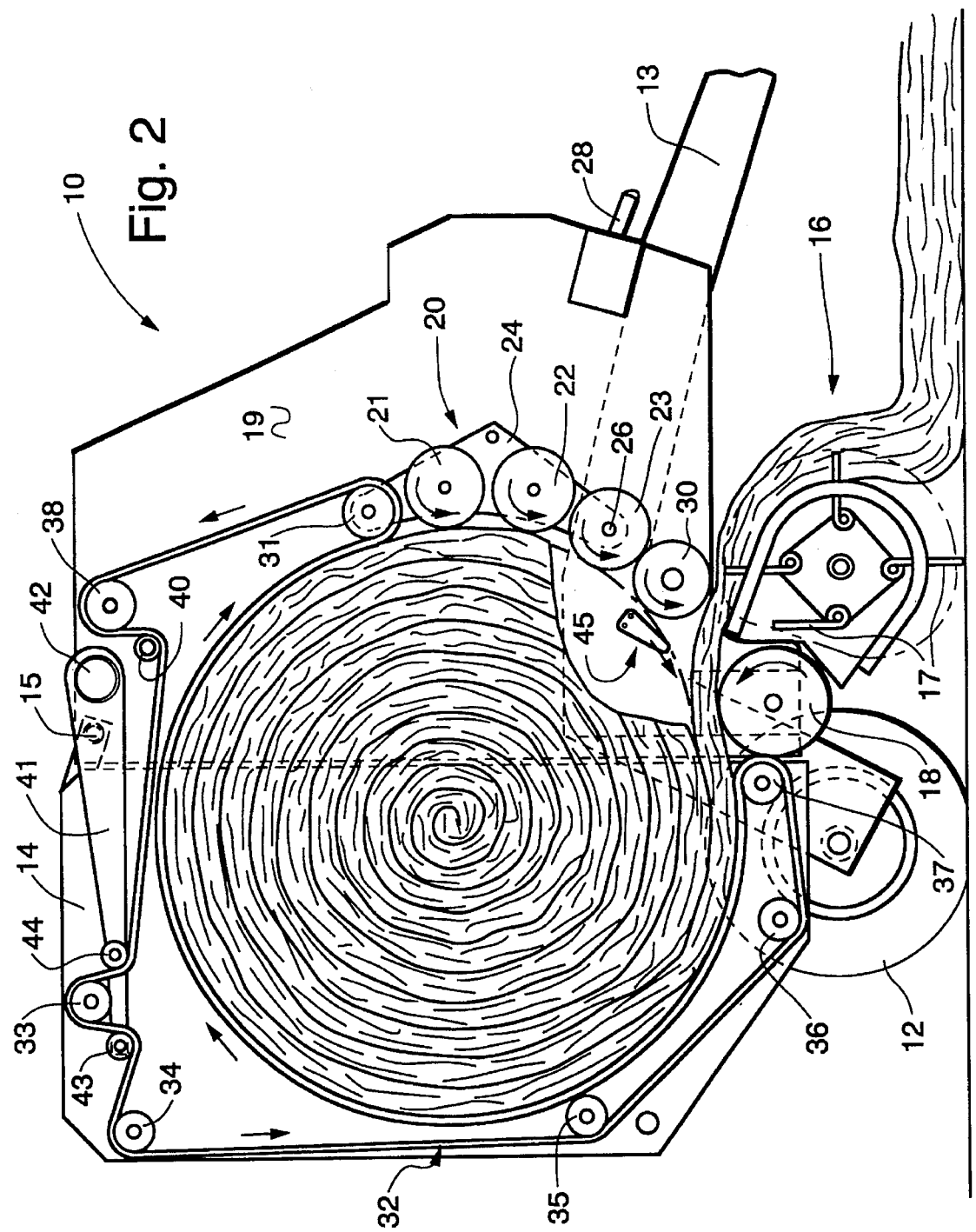
FIG. 2 is similar to FIG. 1 with the bale forming chamber in its full condition.

During bale formation, sledge assembly 20 also moves between a bale starting position (FIG. 1) to a full bale position (FIG. 2). This movement of sledge assembly 20 causes idler roller 31 to move in an arcuate path while maintaining apron 32 in close proximity to roller 21, thereby allowing roller 21 to strip crop material from the belts and prevent or reduce significantly the loss of crop material between roller 21 and apron 32 during formation of a bale. Sledge assembly 20 is pushed outwardly towards its full bale position during bale formation as the crop material expands against rollers 21, 22, 23 and then subsequently is pulled inwardly by apron 32 to the position shown in FIG. 1.

With the above description and general operation of baler 10 as a background, attention is directed to a sensor assembly 45 mounted on side wall 19, shown in FIGS. 1 and 2. Although only one sensor assembly is shown and described, it should be understood that this invention contemplates the use of left and right sensors, each separately mounted on the inside of an associated opposing side wall of baler 10. A paired arrangement of this nature is disclosed in U.S. Pat. No. 5,444,969, referred to above, which is hereby incorporated by reference.

FIG. 3 shows one sensor assembly, designated by reference numeral 45, mounted on side wall 19, as shown in FIGS. 1 and 2. Another sensor assembly is similarly mounted on the opposing side wall (not shown) of baler 10, in a paired arrangement as mentioned above. For the purposes of this description, only assembly 45 will be described in detail but it is intended that like comments would apply to its counterpart assembly mounted on the opposing side wall.

Figure 5:
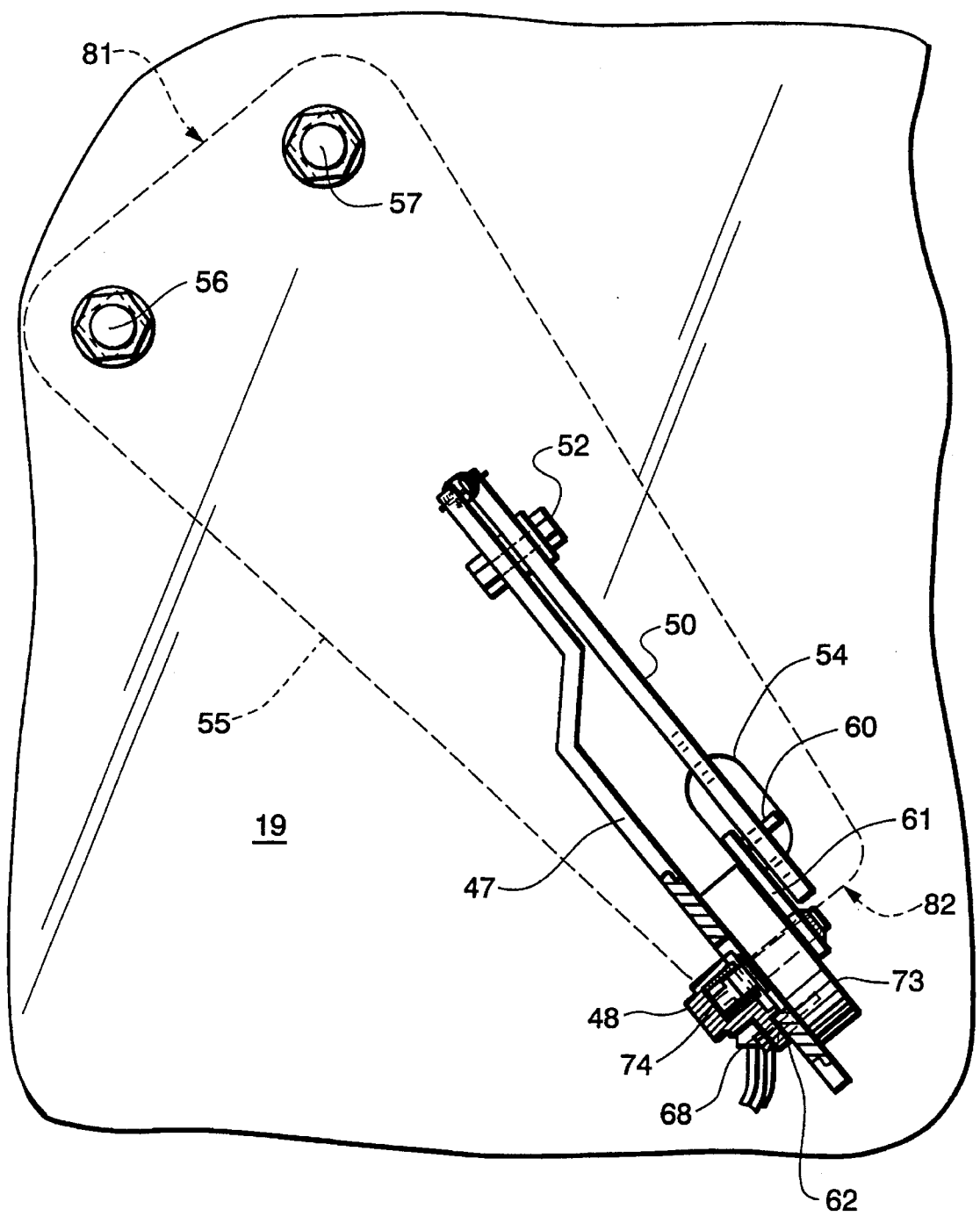
FIG. 5 is a view taken in the direction of arrows 5—5 in FIG. 3.

A mounting bracket 47, affixed to the outside of side wall 19, has mounted thereon a potentiometer 48 and a pivotally mounted sensor plate 50. A spring 51 engages plate 50 to urge it in a counter-clockwise direction about a bolt 52, at which bolt, plate 50 is pivotally mounted to bracket 47. Spring 51, under tension, holds plate 50 against the outside surface of wall 19, at shoulder 49 in the empty chamber condition shown in FIG. 3. An integral finger portion 53 of plate 50 extends through wall 19 via oval shaped aperture 54. Finger 53 is urged toward a leaf spring 55 secured to the inside of side wall 19 by conventional means such as bolts 56, 57 (see FIG. 5). Leaf spring 55 is preset in the position and shape shown in FIG. 3 under no load conditions. Spring 51 in such no load position provides force sufficient to keep shoulder 49 against wall 19. Thus, under conditions where there is no crop material in the vicinity of the sensor in the chamber, the end of finger portion 53 is in contact with leaf spring 55 but applies no force thereagainst.

A slot 58, in plate 50 accommodates an actuator rod 60 extending from a rocker arm 61. When plate 50 swings about pivot 52, rod 60 traverses slot 58 and thereby moves rocker arm 61 between the position shown in FIG. 3 and the position shown in FIG. 4, the latter of which illustrates the position of the elements of sensor assembly 45 under conditions where maximum crop compaction in the vicinity of sensor 45 is sensed.

Potentiometer 48, a commercially available product, is manufactured by CTS Corporation, Elkhart, Ind., and designated by Part Number 6594. It is a sealed unit which enhances system integrity in the dust and debris laden environment under which round balers operate. This troublesome environment is especially prevalent in the chamber where straw, hay and various other field harvested crop materials are continuously agitated during formation of the compact cylindrical package. Ears 62, 63 (see FIG. 6) extend from the body of potentiometer 48 to provide for securement to surface 64 of mounting bracket 47. A circular opening 65 in bracket 47 snugly accommodates lip 66 extending circumferentially around a centrally located access opening for potentiometer rotor 67, which is spring loaded to the home position depicted in FIG. 3. The rotor is rotatable against its spring in a conventional manner. The drive angle is approximately 104 degrees in a counterclockwise direction. Thus, in addition to spring 51 providing a force on control arm 50 in the home position, additional force is provided by potentiometer rotor 67 which is urged in a clockwise direction and thereby acts with spring 51 to urge arm 50 in a counter-clockwise direction via rod 60 mounted on rocker arm 61. This force on rod 60 pushes it against the right edge of slot 58 and provides zero tolerance positioning relative to slot 58, regardless of variations in the slot width caused by manufacturing tolerances and wear. Thus, the position of the potentiometer rotor is precisely maintained relative to arm 50 and accordingly, leaf spring 55.

Figure 6:
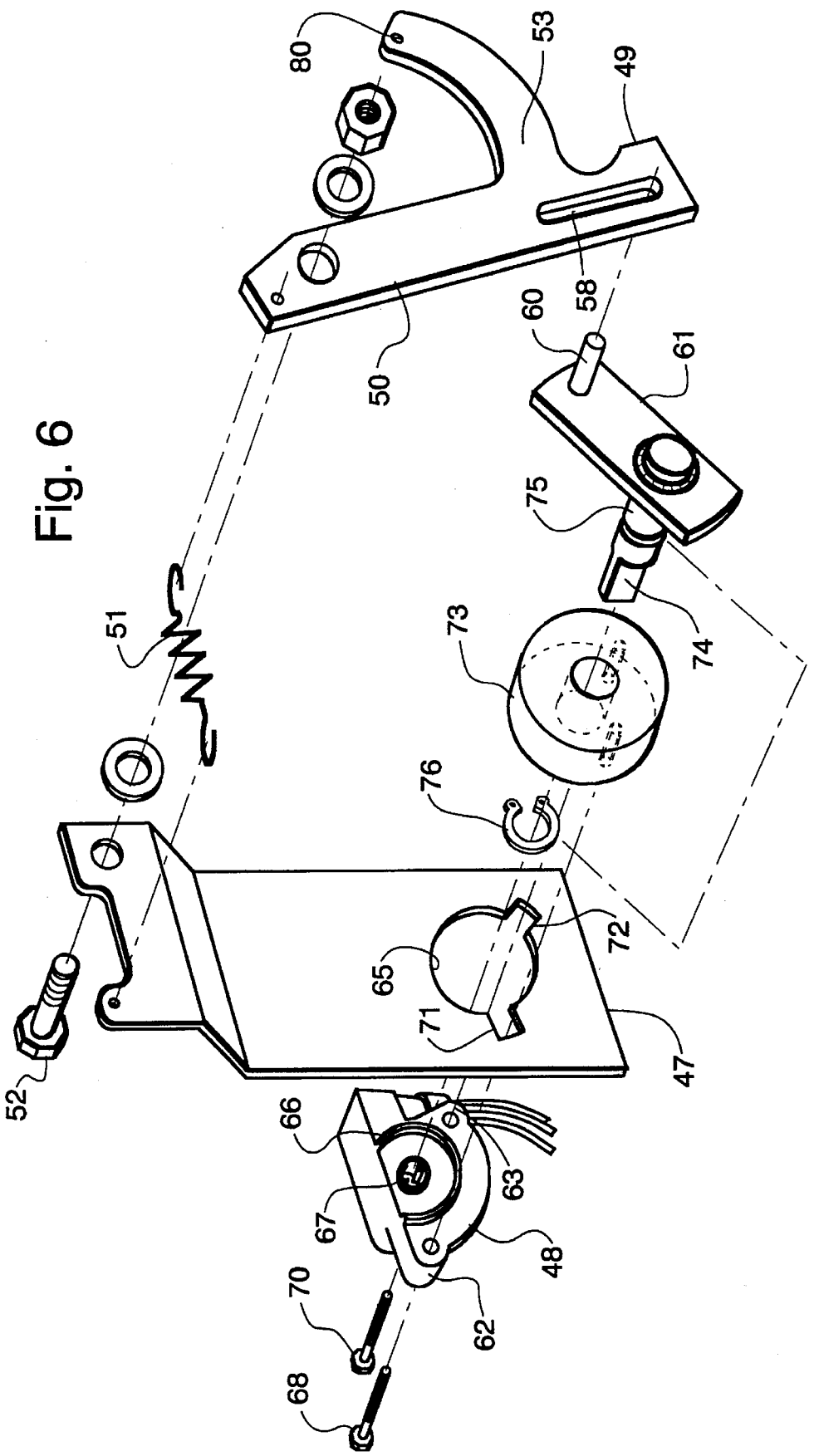
FIG. 6 is an exploded diagrammatic view showing the relationship of certain elements of the compaction sensor.

As depicted in FIG. 6, potentiometer 48 is adjustably mounted to bracket 47 by screws 68, 70 which pass through notches 71, 72 and are secured to steel nut 73. The flat end 74 of pin 75 extends through the center of nut 73 and is secured in place by clip 76 relative to nut 73. The outer diameter of pin 75 is less than the inner diameter of the bore in nut 73 to provide for relative movement when plate 50 is rotated. The rotor access opening 48 accommodates flat end 74 via mating shoulders in the recess of rotor 67, accessible through the opening, such that rotation of plate 50 is transferred to rotation of the potentiometer rotor via rod 60, rocker arm 61, and the flat end of pin 75.

The analog signals provided by potentiometers 48 and 48', mounted on the opposing sidewall (not shown), are fed to a signal processing network 77 (FIG. 7) and converted to digital values that are processed to provide comparative readouts ultimately displayed by display unit 78. The potentiometer used enables the utilization of microprocessing technology that gives precise indications of the degree of crop compaction sensed by sensor assembly 45. Further, such precision is significantly enhanced by the ability to calibrate the sensors during assembly and service. When screws 68, 70 are secured in nut 73, it is pulled snugly against mounting bracket 64 with lip 66 nesting in opening 65. By backing out the screws to overcome friction, potentiometer 48 may be rotated in concert with nut 73, relative to bracket 64, over a degree of freedom established by the width of notches 71, 72. This permits the potentiometer to be precisely positioned when arm 50 is in the position shown in FIG. 3, enabling the no bale condition to be accurately set. Then, to simulate "full bale" position and ascertain the exact signal at the other extreme of travel after calibration of the home end, arm 50 is manually urged to the position shown in FIG. 4 and held there, assisted if desired by a pin inserted across aperture 54, through hole 80, and inwardly of wall 19.

Figure 8:
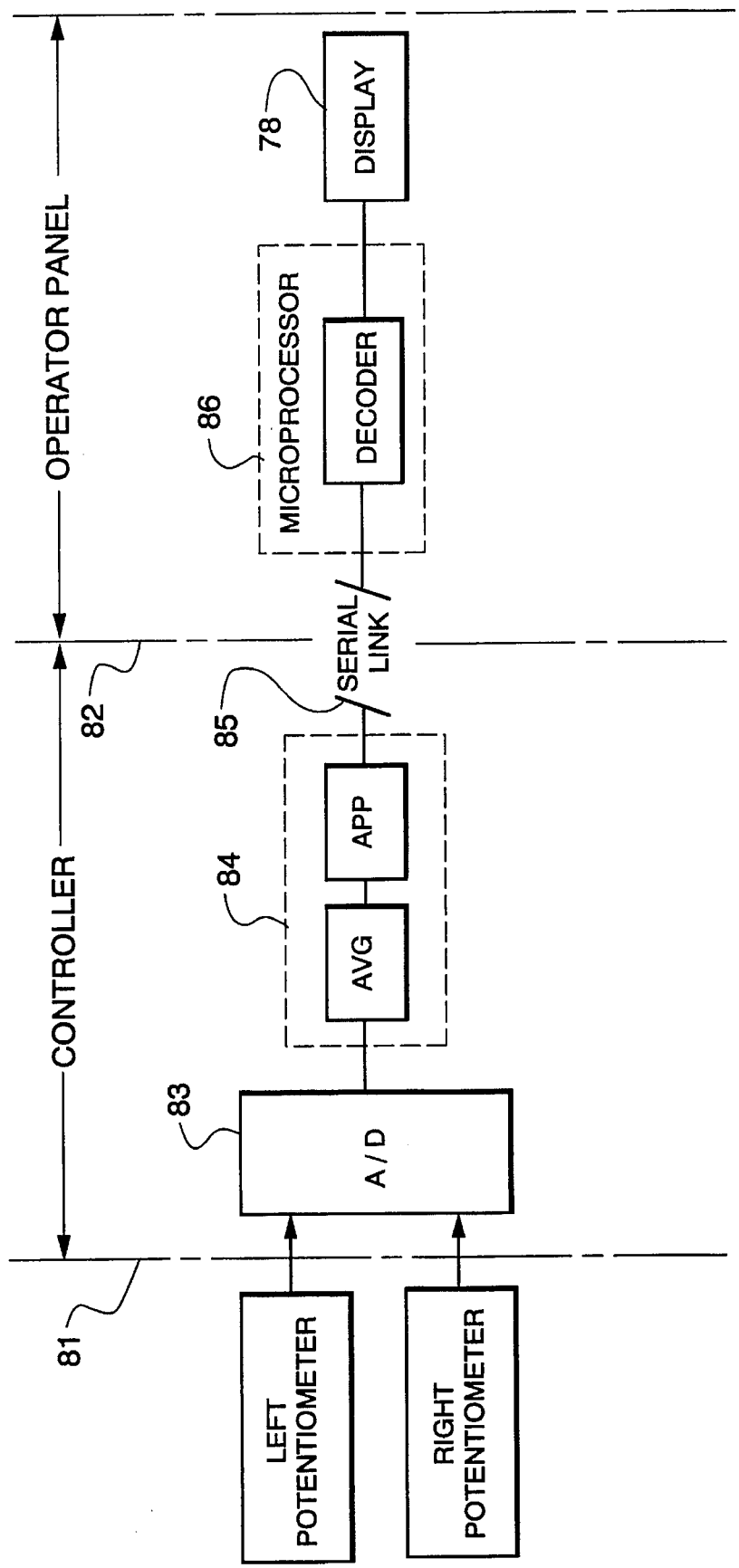
FIG. 8 is an electrical system diagram showing the relationship of various key components of the present invention.

Now referring to FIG. 8, the general block diagram of the electronic system shown in FIG. 7 will be described in further detail. The electrical system diagram of FIG. 8 comprises a signal input section to the left of line 81, a controller section, between lines 81 and 82, and an operator panel section to the right of line 82. The sensors of the input section are mounted on the baler as discussed above, as is the controller, while the operator panel is remotely located in the operator's control area of the tractor to which the round baler is coupled by tongue 13.

More specifically, potentiometers 48 and 48' introduce continuous analog signals into an analog-to-digital converter circuit 83, which produces digital values representative of the analog inputs in a conventional manner. These digital values are processed in a microprocessor 84 which is programmed to evaluate the incoming values, based on signals sensed by the potentiometers, and yield digital data corresponding to averaged levels of comparative degrees of compaction. This data is transferred via a serial link 85 between the controller and operator panel to a second microprocessor 86 programmed for decoding the digital data and producing signals in a conventional manner for display in display unit 78. Although the readout may comprise a series of LCD's, LED's, or the like, with appropriate driver circuitry, the utilization of readouts in side-by-side vertical bar graph format to yield comparative degrees of left and right compaction is a significant improvement over what has heretofore been made available to operators of round balers.

The data that is derived from signals at potentiometers 48 and 48' is processed on the round baler in the controller which permits it to be passed to the operator panel, via serial link 85, with attendant advantages of such data transfer in an adverse environment, which include the presence of various magnetic and electrical components that generate unwanted transient noise that could lead to adverse affects on analog data. Another advantage of the serial link system is the ability for the round baler and incorporated controller to be readily disconnected and recoupled to any tractor equipped with a compatible operator panel.

In operation, as mentioned above, crop material is picked up by pickup 16 and conveyed by tines 17 to floor roll 18 which urges it against upwardly traveling course c of apron 32. Initially, when the bale forming chamber is empty (FIG. 1), material begins to spiral in a clockwise direction until it engages the rollers of sledge assembly 20 which continue to coil it in a spiral fashion causing course c to expand until it reaches the full bale position shown in FIG. 2. During such bale forming operation, crop material adjacent the side walls in the peripheral portion of the cylindrical package being formed is in continuous contact with leaf spring 55 of opposing similar sensor assemblies 45. More specifically, crop material traverses the leaf springs in a longitudinal fashion along a generally spiral path from the upstream end 81 to the downstream end 82. In this manner the degree of crop compaction is sensed as the preset bias is overcome and the leaf springs are urged toward the side walls. The position of potentiometer rotor 67 will vary based on the position of its associated leaf spring, which moves toward or away from the side wall in response to the force exerted by crop material passing thereover. This force is directly proportional to the degree of compactness of the crop material. The leaf springs in turn move the associated control arms of the potentiometers, thereby varying the voltage potential in direct relationship to the compactness of the crop material which is indicated by display unit 78 in the manner described above.

Figure 9C:
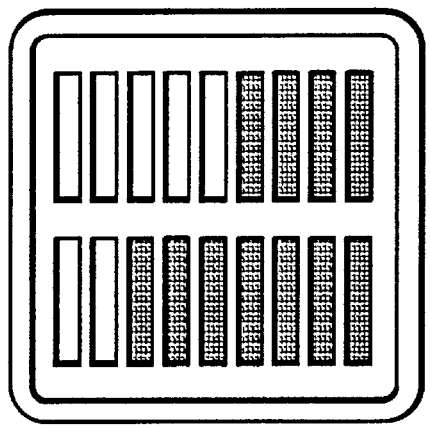
FIG. 9A–9C are diagrammatic illustrations showing three exemplary conditions displayed by the bar graph indicators of the present invention.
Figure 9B:
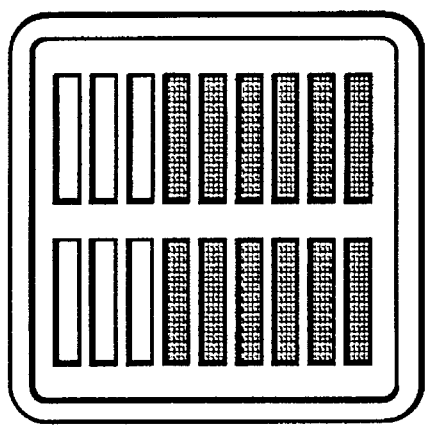
Figure 9A:
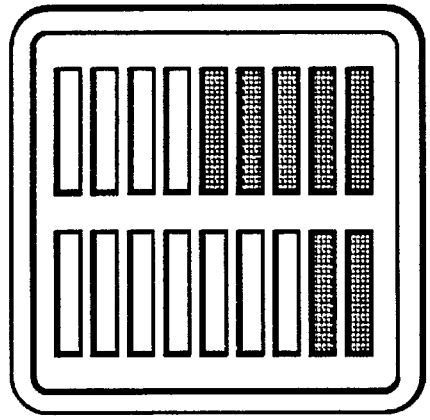

Thus, as the cylindrical package of crop material increases in size the comparative degree of compactness of its ends is monitored enabling the operator to modify the relative quantity of crop material being fed to the transverse regions of the bale forming chamber in response to left and right readout levels, as depicted in three exemplary conditions of the vertically arranged side-by-side visual designators shown in FIG. 9. For example, when a predetermined differential of levels is exceeded and the left end is low, the operator is so apprised by visual perception, i.e., the condition illustrated in condition 9(a) of the bar graph display on the operator panel, where the illuminated visual designators are shown as being darkened. In this instance the operator will steer the baler to fill the left side until the left and right levels of compaction reach an acceptable relationship, such as that shown by the darkened designators in FIG. 9(b). In the event the comparative degree of compaction displayed in the readout reaches an unacceptable relationship due to low compaction on the right end of the cylindrical package of crop material being formed in the chamber, as shown in FIG. 9(c), the operator is likewise so apprised and reacts by steering the baler to fill the right side with crop material until the readouts of the bar graphs become balanced or attain an acceptable proportionate relationship.

Of the many implicit and explicit advantages of the innovative system of the present invention apparent in the above description of the preferred embodiment, one of the most significant is the provision of an accurate, consistent and reliable system for conveniently displaying comparative information continuously corresponding to compaction of crop material in the chamber of a round baler during bale formation.

While preferred structure incorporating principles of the present invention is shown and described above, it is to be understood that the invention is not limited to such structure, but that, in fact, widely different means of varying scope and configuration may be employed in the practice of the invention.

Having thus described the invention, what is claimed is:

1. In a round baler having a pickup for picking up crop material and feeding it rearwardly, an expandable bale forming chamber into which said pickup feeds said crop material along a generally spiraling path, said chamber includes opposing sidewalls between which a generally cylindrical shaped package of crop material is formed, left and right crop compaction sensors each of which is mounted on one of said opposing sidewalls, said sensors including means for continuously sensing the degree of compaction of crop material in the vicinity of said opposing sidewall under conditions where said crop material is fed along said generally spiralling path during formation of a cylindrical package of crop material in said chamber, a system for displaying information corresponding to the relative degree of compaction sensed by said left and right crop compaction sensors, the improvement comprising display means comprising left and right bar graph indicators for providing independent readouts corresponding to the degree of compaction sensed by said left and right crop compaction sensors, said bar graph indicators each comprise a like plurality of vertically grouped visual designators, said left and right indicators arranged in side-by-side fashion enabling direct comparison to right and left degree of compaction being sensed, and means for electronically coupling said display means to said sensors comprising means for continuously producing analog output signals which vary as the degree of compaction being continuously sensed varies, and analog to digital converter means responsive to said analog signals to produce digital values representative of the actual degree of compaction being continuously sensed by said left and right crop compaction sensors.

2. In a round baler as set forth in claim 1 wherein said means for coupling said display means to said sensors further comprises microprocessor control means including means responsive to said digital values for providing digital signals representative of an average of said signals being simultaneously sensed by said sensors.

3. In a round baler as set forth in claim 2 wherein said means for coupling said display means to said sensors further comprises second microprocessor control means for receiving said digital signals and energizing said visual designators of said left and right bar graph indicators in response to said digital signals.

4. In a round baler as set forth in claim 3 wherein said means for coupling said display means to said sensors further comprises a serial link between said microprocessor control means and said second microprocessor control means to transfer said digital signals therebetween wherein said microprocessor control means are mounted contiguous with said opposing sidewalls and said second microprocessor control means is mounted remote from said microprocessor means.

5. In a round baler as set forth in claim 1 wherein said left and right crop compaction sensors comprise a pair of potentiometers providing signals corresponding respectively to the degree of compaction of said first and second portions of said generally spiralling path of said crop material being formed into a generally cylindrically shaped package in said expandable bale forming chamber, and each of said potentiometers is operable independently of the other to provide said analog signals to indicate the relative compactness of said first and second portions via said left and right indicators.

* * * * *